A. SHUMAN.
MACHINE FOR AND METHOD OF MAKING CORRUGATED WIRE GLASS.
APPLICATION FILED FEB. 3, 1920.
1,397,149.
Patented Nov. 15, 1921.
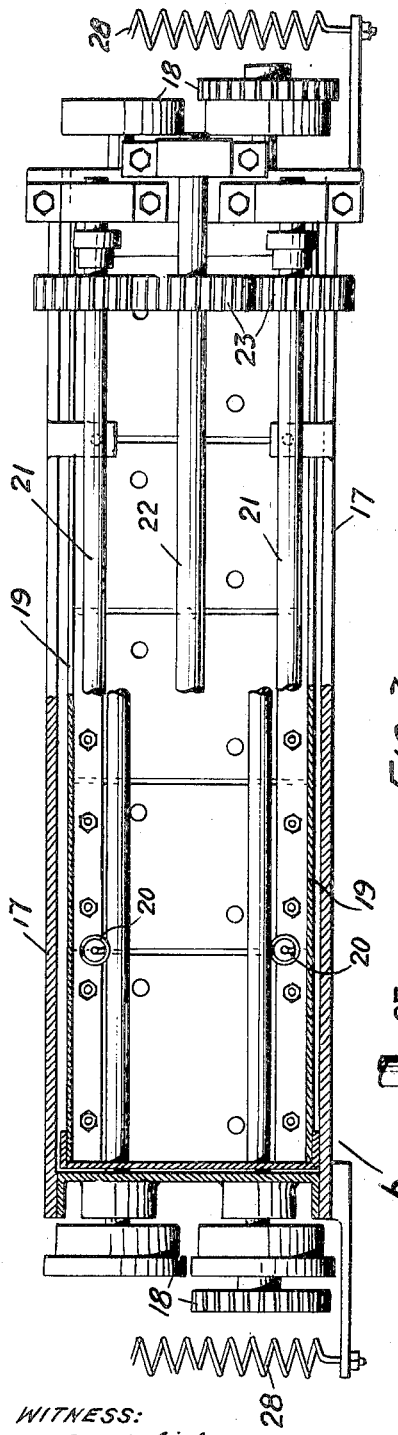
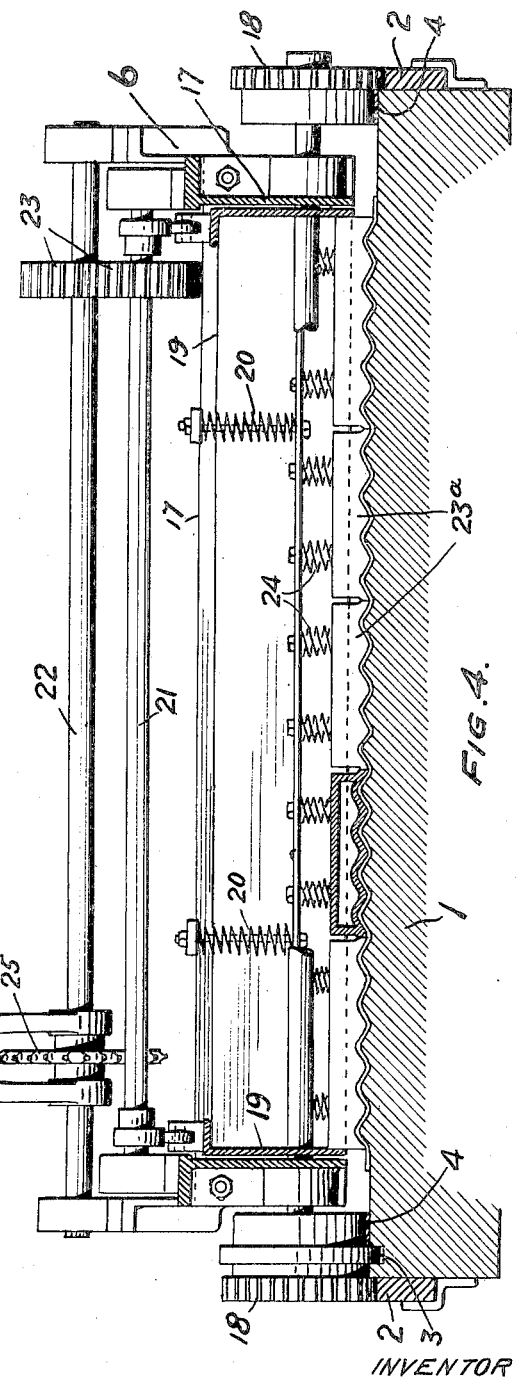
WITNESS:
INVENTOR
Arno Shuman
BY
Augustus B. Stoughton
ATTORNEY.

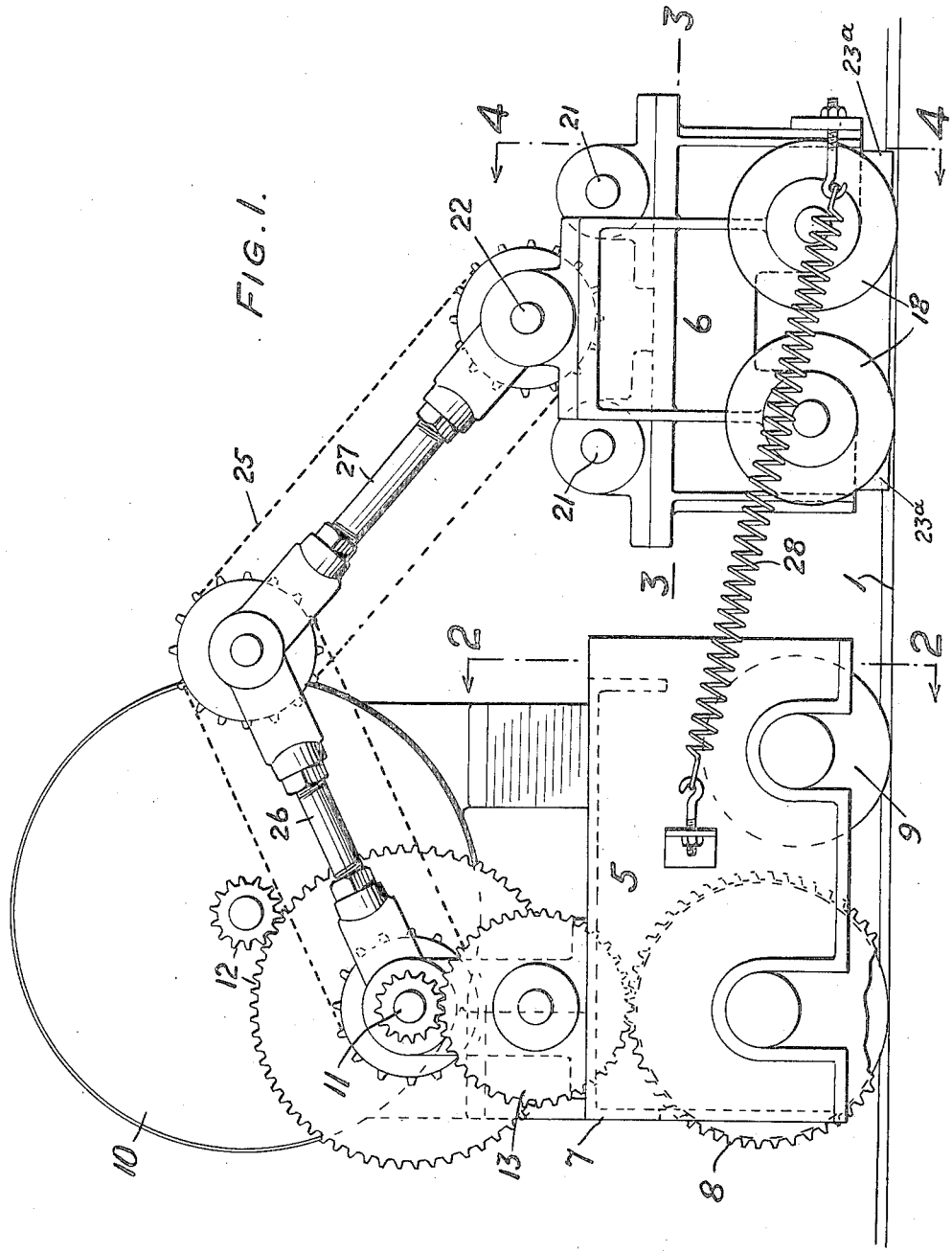

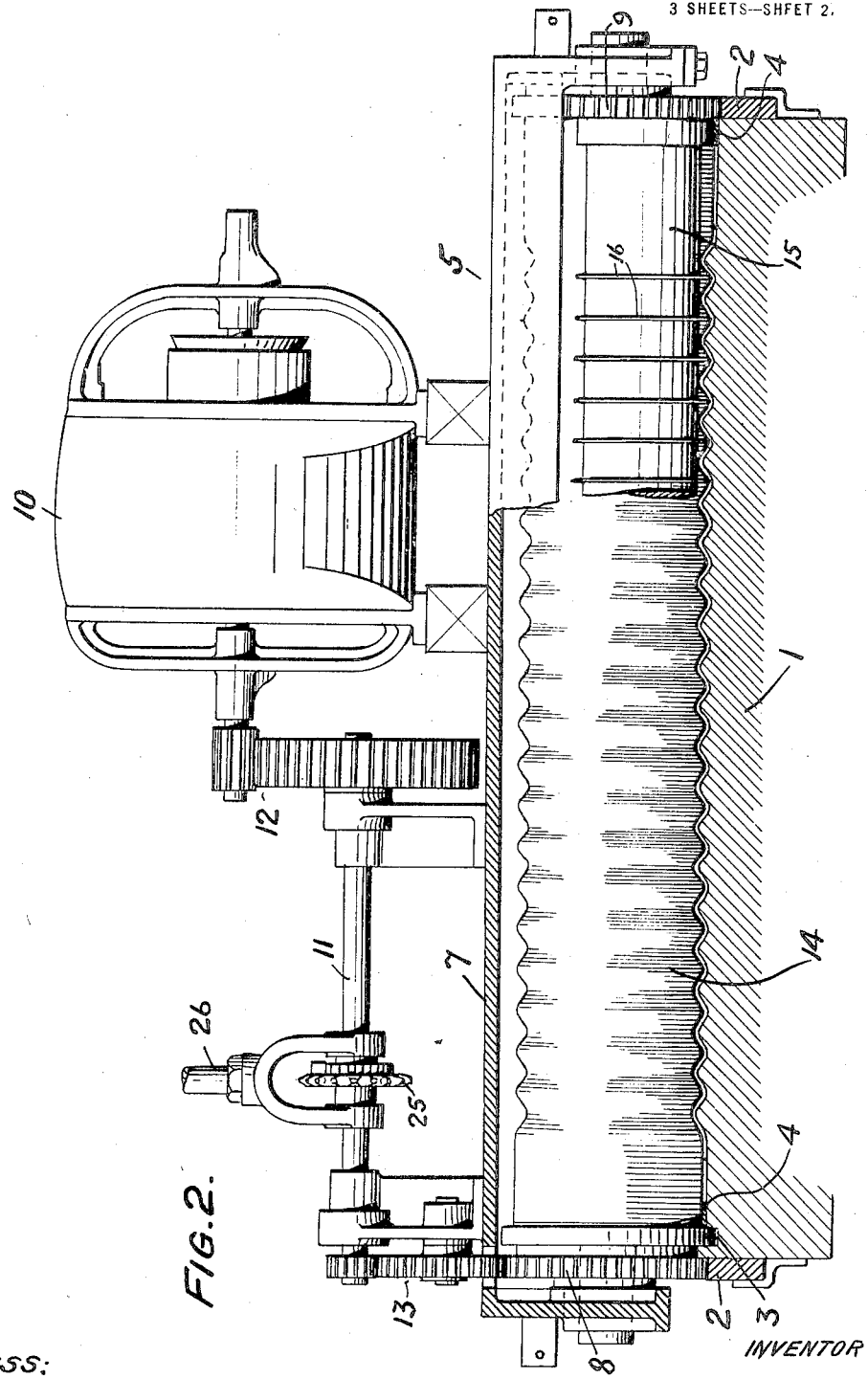

UNITED STATES PATENT OFFICE.

ARNO SHUMAN, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY.

MACHINE FOR AND METHOD OF MAKING CORRUGATED WIRE-GLASS.

1,397,149.      Specification of Letters Patent.      Patented Nov. 15, 1921.

Application filed February 3, 1920. Serial No. 356,015.

*To all whom it may concern:*

Be it known that I, ARNO SHUMAN, a citizen of the United States, residing at Philadelphia, in the county of Philadelphia and State of Pennsylvania, have invented certain new and useful Improvements in Machines for and Methods of Making Corrugated Wire-Glass, of which the following is a specification.

The principal object of the present invention is to provide for the manufacture of corrugated wire glass in which the wire is properly centered and which presents smooth and sightly surfaces. To this and other ends hereinafter set forth the invention comprises the method and apparatus hereinafter described and finally claimed.

In the following description reference will be made to the accompanying drawings forming part hereof and in which—

Figure 1, is a somewhat diagrammatic side view of parts of an apparatus embodying features of the invention and adapted for use in its practice.

Fig. 2, is a sectional view taken generally on the line 2—2, of Fig. 1, looking in the direction of the arrows and showing parts omitted from Fig. 1.

Fig. 3, is a horizontal sectional view taken generally on the line 3—3, of Fig. 1, with the righthand in Fig. 1, arranged toward the bottom of the sheet, and Fig. 4, is a transverse section taken generally on the line 4—4 of Fig. 1, looking in the direction of the arrows.

In accordance with the method of this invention a corrugated sheet of wire glass is made by rolling with a corrugated roll and a corrugated table, and the rolled corrugated sheet of wire glass while still hot is subjected to a pressing operation with a corrugated press upon the corrugated table whereby distribution of the glass in proper corrugations in respect to the corrugated wire is assured and attained, and whereby the corrugated surfaces of the glass are freed from gashes and marks which may have been made upon them, for example, in cases where the corrugated wire glass sheets have been additionally rolled with a flanged roller in order to preliminarily center the wire mesh or in cases where the surfaces have been otherwise marred or deformed. Good results have been obtained by introducing the wire mesh into the sheet by the so-called "crimped method" in accordance with which the wire mesh is crimped and by stretching is introduced automatically into the sheet and corrugated as the latter is rolled in corrugated form, but the invention in some of its aspects is not limited to that method of introducing the wire mesh, and similarly the invention is not limited to the use of a flanged roller for centering the wire mesh prior to the operation of pressing it into corrugated form. A leading feature of the invention is the production of corrugations in the glass sheet and in the wire mesh by subjecting them to a corrugated rolling operation followed by corrugated pressing operation.

Reference will now be made to the drawings in describing apparatus embodying all the features of the invention, but it may be said that the conjoint use of all of them is not necessary in all cases. 1, is a lengthwise corrugated table shown as fitted with the usual side racks 2, guide groove 3, and trangs 4. There are two carriages of which the leading one may be called the tractor and designated collectively 5, and of which the following one may be called the trailer and designated collectively 6. The tractor 5, consists of an open bottom frame 7, mounted on wheels 8 and 9, that run on the racks 2, and provided with a motor 10, geared to the wheels 8, through a shaft 11, and by sets 12 and 13, of gear wheels. The tractor carriage 5, is also provided with a roller 14, driven by the wheels 8, and having its surface corrugated in such a way as to be substantially parallel with the corrugated surface of the table. As shown the tractor carriage 5, is provided with a second roll 15, closely following the corrugated roll 14, and provided with circumferential ribs 16, alined with, but not touching, the valleys or low parts of the corrugations in the table 1. The trailer carriage 6, consists of a generally rectangular frame 17, mounted on wheels 18, of which some are provided with teeth meshing with the teeth of the guide racks 2, in order to preserve parallelism. Inside of the frame 17, is a vertically movable press frame 19, solicited upward by springs 20, and pressed downward toward the table by rotating cams shown as arranged near its corners and mounted on shafts 21, carried by the frame 17, and driven from shaft 22, through gearing 23. Inside and at the bottom of the press frame 19, are corrugated presser-plates 23ª, shown as hollow for water cooling and they are solicited downward toward the table 1, by springs 24. As shown power is transmitted from the motor driven shaft 11, to the cam driving shaft 22, by sprocket gearing 25, carrier by scissor-arms 26 and 27, pivoted together and to the tractor and trailer carriages, so that power can be transmitted when the tractor carriage is moving along the table and the trailer carriage is temporarily at rest. 28, are springs connecting the carriages and affording means whereby the tractor carriage may travel continuously and the trailer carriage travel intermittently.

In practising the invention by means of the described apparatus crimped wire mesh, which may be corrugated if desired, is arranged on the table, and a pour of glass is made in advance of the carriages 5 and 6, which are then run over the table, the carriage 5, with a continuously advancing movement and the carriage 6, with an intermittently advancing movement. The roller 14, in rolling the sheet corrugates it and also corrugates the wire mesh which becomes embedded in it, and the flanges 16, of the roller 15, cut into the sheet and correct faults if any exist in the position of the wire mesh more especially at the deep parts of the grooves or corrugations in the table. During the first operation the skin of the glass is somewhat cooled and set, but the glass tends to settle in the deep parts of the corrugations in the table producing unevenness in the thickness of the sheet, and sometimes imperfections in its surface, and this is true whether the flanged roller 15, is used or not. This fault and gashes caused by the flanged roller when used, are corrected by the action of the corrugated presser plates 23ª, in connection with the corrugated table, because the presser plates repeatedly pat and press the sheet while it is cooling and so mold it into proper corrugated form. It will be understood that when the cams 18, press the presser plates 23ª, upon the surface of the corrugated wire glass sheet the resultant friction checks the motion of the carriage 6, stretching the springs 28, and that when the plates 23ª, are permitted by the cams 18, to rise under the action of the springs 20, the carriage 6, is advanced by contraction or recoil of the springs 28. In this way repetitions of the pressing operation over the face of the sheet are brought about.

I claim:

1. The method of making corrugated wire glass which consists in rolling a corrugated sheet of wire glass and repeatedly pressing the same corrugated parts of the rolled sheet while still hot, substantially as described.

2. The method of making corrugated wire glass which consists in subjecting the wire and glass to a rolling operation to corrugate it followed by repetitions of a pressing operation to pat and press the corrugations.

3. The method of making corrugated wire glass which consists in rolling a crimped sheet of wire mesh into a corrugated sheet of glass, centering the wire mesh in the hot corrugated sheet by operating through the surface of the sheet, and repeatedly patting the surface of the corrugations while hot, substantially as described.

4. Apparatus for making corrugated wire glass comprising the combination of a corrugated table and a two part carriage arranged to travel on the table and whereof one part is a roller element and operates continuously and rolls a corrugated sheet of wire glass and whereof the other part is a corrugated press element and operates intermittently and presses the rolled sheet, substantially as described.

5. In apparatus for making corrugated wire glass the combination of a corrugated table and a corrugated roller, and a corrugated press arranged for repeated operation on the same parts of the glass in rear of the roller and in coöperation with the corrugated table.

6. In apparatus for making corrugated wire glass the combination of a corrugated table, a corrugated roller, means for continuously propelling the roller along the table, a corrugated press, and means for intermittently propelling the press along the table in rear of the roller, and for repeatedly operating it upon the same parts of the glass substantially as described.

7. In apparatus for making corrugated wire glass, the combination of a corrugated table, a corrugated roller and a ribbed roller arranged in the wake of the corrugated roller, means for continuously propelling said rollers along the table, a corrugated plunger press, and means for intermittently propelling the press along the table.

8. In apparatus for making corrugated wire glass the combination of a carriage provided with a roller and with a motor and driving gear, a second carriage provided with a press and means for operating it, a resilient connection between the carriages whereby the leading one may travel continuously and the following one intermittently, and means for transmitting power from one carriage to the other, substantially as described.

9. In apparatus for making corrugated wire glass the combination of a leading carriage provided with glass rolling mechanism, a following carriage provided with glass pressing mechanism, and a resilient connection interposed between the carriages whereby the leading carriage may progress continuously and draw the following carriage with an intermittent movement, substantially as described.

10. In apparatus for making corrugated wire glass the combination of a tractor carriage mounted on wheels and provided with a motor and with a corrugated roll, a trailer carriage mounted on wheels and provided with spring-retracted corrugated presser plates and cam means for operating them, springs connecting said carriages, and scissor-arms provided with sprocket transmission mechanism for transmitting power between the carriages and for permitting of different rates of movements thereof, substantially as described.

11. In apparatus for making corrugated wire glass the combination of a leading carriage provided with a corrugated roller, a following carriage provided with a spring retracted cam advanced press mechanism having spring supported corrugated presser plates, and means for operating said parts, substantially as described.

ARNO SHUMAN.